(12) United States Patent
Luo et al.

(10) Patent No.: US 12,520,032 B2
(45) Date of Patent: Jan. 6, 2026

(54) PARAMETER DETERMINING METHOD AND RELATED DEVICE

(71) Applicant: HUAWEI TECHNOLOGIES CO., LTD., Guangdong (CN)

(72) Inventors: Yingzhao Luo, Shenzhen (CN); Dong Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/643,048

(22) Filed: Apr. 23, 2024

(65) Prior Publication Data

US 2024/0276095 A1  Aug. 15, 2024

Related U.S. Application Data

(63) Continuation of application No. PCT/CN2022/126715, filed on Oct. 21, 2022.

(30) Foreign Application Priority Data

Oct. 27, 2021 (CN) .......................... 202111258085.X

(51) Int. Cl.
| | |
|---|---|
| *H04N 23/611* | (2023.01) |
| *G06T 7/80* | (2017.01) |
| *H04N 17/00* | (2006.01) |
| *H04N 23/62* | (2023.01) |
| *H04N 23/69* | (2023.01) |

(Continued)

(52) U.S. Cl.
CPC ............ *H04N 23/611* (2023.01); *G06T 7/80* (2017.01); *H04N 17/002* (2013.01); *H04N 23/62* (2023.01); *H04N 23/69* (2023.01); *H04N 23/695* (2023.01); *H04N 23/90* (2023.01)

(58) Field of Classification Search
CPC .... H04N 23/611; H04N 23/69; H04N 23/695; H04N 23/90; H04N 23/62; H04N 17/002; G06T 7/80
See application file for complete search history.

(56) References Cited

U.S. PATENT DOCUMENTS

2019/0174122 A1* 6/2019 Besley ................ H04N 13/243

FOREIGN PATENT DOCUMENTS

| CN | 108053469 A | 5/2018 |
|---|---|---|
| CN | 113077519 A | 7/2021 |

(Continued)

*Primary Examiner* — Yassin Alata
(74) *Attorney, Agent, or Firm* — WOMBLE BOND DICKINSON (US) LLP

(57) ABSTRACT

A parameter determining method for a control device and a related device are disclosed, to automatically determine an image adjustment parameter of a collection device. The method includes: controlling poses of a plurality of pan-tilt-zooms, causing lenses of N collection devices on the plurality of pan-tilt-zooms to point to a target subject in a target area, where the N collection devices are arranged around the target area, and N is a positive integer greater than 1; obtaining N images, where each of the N images is a frame of image collected by each of the N collection devices for the target subject; and determining image adjustment parameters of the N collection devices based on skeletal features extracted from the N images, and the image adjustment parameters are used to obtain the frame image of the free viewpoint video.

18 Claims, 11 Drawing Sheets

(51) Int. Cl.
*H04N 23/695* (2023.01)
*H04N 23/90* (2023.01)

(56) References Cited

FOREIGN PATENT DOCUMENTS

| | | | |
|---|---|---|---|
| JP | 2019102877 A | | 6/2019 |
| JP | 20191028877 | * | 6/2019 |

* cited by examiner

401: A control device controls poses of a plurality of pan-tilt-zooms, so that lenses of N collection devices on the plurality of pan-tilt-zooms point to a target subject in a target area 402: The control device obtains N images 403: The control device determines image adjustment parameters of the N collection devices, where the image adjustment parameters are determined based on skeletal features extracted from the N images

FIG. 4

PARAMETER DETERMINING METHOD AND RELATED DEVICE

CROSS-REFERENCE TO RELATED APPLICATIONS

This application is a continuation of International Application No. PCT/CN2022/126715, filed on Oct. 21, 2022, which claims priority to Chinese Patent Application No. 202111258085.X, filed on Oct. 27, 2021. The disclosures of the aforementioned applications are hereby incorporated by reference in their entireties.

TECHNICAL FIELD

Embodiments of this application relate to the image collection field, and in particular, to a parameter determining method and a related device.

BACKGROUND

A free viewpoint technology is a technology of synchronously shooting, storing, processing, and generating a free viewpoint video by using a multi-point image collection system. Before image shooting, calibration of a plurality of image collection devices needs to be completed, and an image adjustment parameter of each collection device is determined in a calibration process, so that images collected by the plurality of collection devices are processed by using the image adjustment parameters, and an effect of smooth switching (free viewpoint) can be implemented.

In a conventional calibration process, collected images that meet requirements need to be obtained to calculate extrinsic parameters and intrinsic parameters of a plurality of image collection devices. A process of obtaining each collected image that meets the requirement is complex, a pose of each collection device needs to be manually adjusted, and calibration personnel need to have some professional calibration knowledge. In addition, a calculation process of the extrinsic parameter and the intrinsic parameter is complex, and requires high computing power, resulting in a complex calibration process.

SUMMARY

Embodiments of this application provide a parameter determining method and a related device, to automatically determine an image adjustment parameter of a collection device, implement automatic calibration, and obtain a frame image of a free viewpoint video.

According to a first aspect, an embodiment of this application provides a parameter determining method, where the method is applied to a control device, and the method includes: The control device controls poses of a plurality of pan-tilt-zooms, so that lenses of N collection devices on the plurality of pan-tilt-zooms point to a target subject in a target area, where the N collection devices are arranged around the target area, and N is a positive integer greater than 1; the control device obtains N images, where each of the N images is one frame of image collected by each of the N collection devices for the target subject; and the control device determines image adjustment parameters of the N collection devices, where the image adjustment parameter is determined based on skeletal features extracted from the N images, and the image adjustment parameter is used to obtain a frame image of a free viewpoint video.

In this embodiment of this application, the image adjustment parameter determined by the control device is determined based on the skeletal features extracted from the N images. The device may automatically complete operations such as obtaining an image, extracting a skeletal feature, and determining an image adjustment parameter based on the skeletal feature. A positioning and installation process is simple, and an installation person can determine a parameter without having professional knowledge.

In an embodiment, before the control device obtains N images, the method may further include: The control device sends a rotation indication, where the rotation indication indicates the target subject to maintain rotation in a target posture. The N images include a first front image collected by a first collection device and a second front image collected by a second collection device, the first collection device and the second collection device are located at adjacent arrangement positions in the N collection devices, and an arrangement position of the first collection device is closer to a primary collection device than an arrangement position of the second collection device, or the first collection device is the primary collection device. The image adjustment parameter includes a target cropped area. The operation of determining, by the control device, image adjustment parameters of the N image collection devices may include: The control device determines a target cropped area of the second image collection device, where the target cropped area is an area of the frame image in an image collected by the second collection device, and the target cropped area is determined based on a skeletal feature extracted from the first front image and a skeletal feature extracted from the second front image.

To determine the target cropped area, cropped areas of front images of N−1 secondary collection devices relative to a front image of the primary collection device need to be determined, and an intersection set of the cropped areas corresponding to the N−1 secondary collection devices is obtained, to obtain target cropped areas of the secondary collection devices, where the target cropped areas include the target cropped area of the second collection device.

In this embodiment of this application, the rotation indication is used to enable the target subject to maintain rotation in the target posture, so that the first collection device and the second collection device respectively collect the first front image and the second front image. Because the first collection device and the second collection device are two collection devices located at adjacent arrangement positions, a similarity between the first front image and the second front image is high, and it is easier to accurately determine the target cropped area. In addition, the target subject maintains a same target posture in the front images. Therefore, there are few variables that are irrelevant to the target cropped area in the two images, and the determined target cropped area is more accurate.

In an optional implementation, the operation of determining, by the control device, a target cropped area of the second image collection device may include: determining an adjacent transformation relationship between the first front image and the second front image; determining, based on the adjacent transformation relationship, a primary-secondary transformation relationship of the second front image relative to a primary collected image of the primary collection device; and determining the target cropped area of the second image collection device based on the primary-secondary transformation relationship.

In this embodiment of this application, by determining the adjacent transformation relationship between the images collected by the first collection device and the second collection device that are located at adjacent arrangement positions, adjacent transformation relationships may be accumulated one by one on two sides (or one side) of the primary collection device by using the primary collection device as a center, to obtain the primary-secondary transformation relationship between images collected by the secondary collection devices and the primary collection device. Because the target cropped area determined by using each secondary collection device is determined based on a corresponding primary-secondary transformation relationship between the second front image and the primary collected image, the target cropped areas are determined based on a same reference, namely, the primary collected image. Therefore, a result of the determined target cropped area is more accurate.

In an embodiment, the target cropped area is used to eliminate errors such as up/down translation, rotation, and scaling between the second front images of the second collection devices and the primary collected image.

In this embodiment of this application, each second collection device determines a target cropped area of the second collection device relative to a same primary collection device, so as to eliminate errors such as up/down translation, rotation, and scaling between the second collection device and the primary collection device, and retain only a left/right translation error between the second collection device and the primary collection device. The plurality of collection devices crop the images based on corresponding target cropped areas, to achieve a smooth switching (free viewpoint) effect.

In an embodiment, the operation of determining, by the control device, image adjustment parameters of the N image collection devices may include: The control device transmits the N images to a computing device, where the N images are used by the computing device to determine the image adjustment parameters based on the skeletal features extracted from the N images.

In this embodiment of this application, the control device transmits the N images to the computing device, and the computing device determines the image adjustment parameter. The control device does not need to perform operations such as skeletal feature extraction and image adjustment parameter determining based on the skeletal feature. This saves resources of the control device, and lowers a requirement for performance of the control device. Therefore, the method in this embodiment of this application is applicable to more control devices with low performance, and an application scope of the method in this embodiment of this application is expanded.

In an embodiment, the image adjustment parameter includes at least one of an up/down translation parameter, a rotation parameter, or a scaling parameter of the front image relative to the primary collected image.

In this embodiment of this application, an image adjustment parameter of each second front image relative to a same primary collected image is determined, to eliminate errors such as up/down translation, rotation, and scaling from the primary collection device, and retain only left/right translation errors from the primary collection device. The plurality of collection devices process the obtained images based on corresponding image adjustment parameters, to achieve a smooth switching (free viewpoint) effect.

In an embodiment, before the control device sends a rotation indication, the method further includes: The control device obtains, through a fine calibration operation interface, an instruction for shooting a fine calibration picture. Before the control device determines image adjustment parameters of the N image collection devices, the method further includes: The control device obtains an automatic fine calibration instruction through the fine calibration operation interface.

In this embodiment of this application, the control device implements interaction with the user through the fine calibration operation interface, thereby improving user controllability of a fine calibration process.

In an embodiment, the operation of sending, by the control device, a rotation indication may include: The control device sends a voice rotation prompt, and/or the control device displays the rotation prompt through the fine calibration operation interface.

In this embodiment of this application, the control device sends the rotation indication in a voice form or through the fine calibration operation interface, so that a rotation manner and a target posture maintained during rotation can be more accurately conveyed to the user, and transferred information of a rotation process is more accurate. In this way, the determined image adjustment parameter can be more accurate.

In an embodiment, the operation of controlling, by the control device, adjustment angles of the plurality of pan-tilt-zooms may include: The control device obtains N rough calibration images, where each of the N rough calibration images is one image collected by each of the N collection devices for the target subject at a same moment; and the control device determines adjustment angles of N−1 secondary pan-tilt-zooms, where the N−1 secondary pan-tilt-zooms are used to adjust poses of N−1 secondary collection devices in the N collection devices, and the adjustment angles of the N−1 secondary pan-tilt-zooms are determined based on skeletal features extracted from the N rough calibration images.

In this embodiment of this application, the control device determines the adjustment angles of the N−1 secondary pan-tilt-zooms by using the skeletal features extracted from the N rough calibration images, so that the N collection devices are all aligned with a preset image center, no repeated manual adjustment is required, and the device can automatically complete the process, thereby implementing a simpler positioning process of the collection device. In addition, the adjustment angles of the N−1 secondary pan-tilt-zooms are determined by using the skeletal feature, and the determined adjustment angle is more accurate than a manual adjustment result.

In an embodiment, before the control device obtains N rough calibration images, the method further includes: The control device obtains a first image of the target subject, where the first image is an image collected by the primary collection device in the N collection devices for the target subject; the control device sends a position adjustment indication, where the position adjustment indication indicates adjustment of a position of the target subject and/or adjustment of a pose of a primary pan-tilt-zoom, so that the target subject is located at a target position in the image collected by the primary collection device; and the control device obtains a second image of the target subject, where in the second image, the target subject is located at the target position.

In this embodiment of this application, the control device enables, by using the position adjustment indication, the target subject to be located at the target position in the image collected by the primary collection device, so that the image center of the primary collection device is aligned with the target subject. In addition, because the pose and the image adjustment parameter of the secondary collection device are determined based on the image of the primary collection device, the position adjustment indication further enables the image center of the free viewpoint to be aligned with the target subject. In other words, alignment of the image center of the free viewpoint is implemented by using the position adjustment indication.

In an embodiment, after the control device obtains a first image of the target subject, the method further includes: The control device displays the first image in a first rough calibration operation interface.

In this embodiment of this application, the control device displays the first image in the first rough calibration operation interface, and displays a real-time image of the primary collection device to the user. The user may adjust the position of the target subject by using the first image.

In an embodiment, after the control device sends a position adjustment indication, and before the control device obtains a second image of the target subject, the method further includes: The control device receives an image adjustment instruction, where the image adjustment instruction instructs to adjust a pose of the primary collection device; and the control device controls an adjustment angle of the primary pan-tilt-zoom, where the primary pan-tilt-zoom is used to change the pose of the primary collection device.

In an embodiment, the operation of receiving, by the control device, an image adjustment instruction may include: The control device receives the image adjustment instruction through the first rough calibration operation interface.

In this embodiment of this application, the control device receives the image adjustment instruction from the user through the first rough calibration operation interface, to adjust the pose of the primary collection device, thereby improving interaction between the user and the control device.

In an embodiment, the skeletal feature includes a skeletal key point. The operation of determining, by the control device, adjustment angles of N−1 secondary pan-tilt-zoom may include: The control device extracts one set of skeletal key points from each of the N rough calibration images, to obtain N sets of skeletal key points; the control device determines one target key point based on each of the N sets of skeletal key points, to obtain N target key points; the control device determines image space deviations between the N−1 secondary collection devices and the primary collection device based on the N target key points; and the control device determines the adjustment angles of the N−1 secondary pan-tilt-zooms based on the image space deviations.

In this embodiment of this application, the control device determines each of the N sets of skeletal key points based on a unified calculation method, and then determines the adjustment angles of the N−1 secondary pan-tilt-zooms based on the obtained N target key points. Because a method for determining each skeletal key point is unified, a calculation result of the target key point is more accurate, so that the determined adjustment angles of the N−1 secondary pan-tilt-zooms are more accurate.

In an embodiment, any one of the N target key points is a geometric center of a corresponding set of skeletal key points.

In an embodiment, before the control device obtains N rough calibration images, the method further includes: The control device obtains an automatic rough calibration instruction through a second rough calibration operation interface.

In this embodiment of this application, the control device implements interaction with the user through the second rough calibration operation interface, so that the user can control a rough calibration process and progress, thereby improving operability of the user on the rough calibration process.

In an embodiment, the target subject is a human body.

In an embodiment, the target posture corresponds to a T-shaped skeletal feature or an A-shaped skeletal feature.

In this embodiment of this application, the T-shaped skeletal feature or the A-shaped skeletal feature can reflect more skeletal point information. Based on the target posture corresponding to the T-shaped skeletal feature or the A-shaped skeletal feature, a calculation granularity in an operation process is more precise (more skeletal points can reflect more precise information), calculation precision is higher, and a determined image adjustment parameter is more accurate.

According to a second aspect, an embodiment of this application provides a parameter determining method, applied to a computing device. The method includes: The computing device receives N images from a control device, where each of the N images is one frame of image collected by each of N collection devices for a target subject, the N collection devices are arranged around a target area, lenses of the N collection devices point to the target subject in the target area, and N is a positive integer greater than 1; and the computing device determines image adjustment parameters of the N collection devices based on skeletal features extracted from the N images, where the image adjustment parameter is determined based on the skeletal features extracted from the N images, and the image adjustment parameter is used to obtain a frame image of a free viewpoint video.

In an embodiment, the N images include a first front image collected by a first collection device and a second front image collected by a second collection device, the first collection device and the second collection device are located at adjacent arrangement positions in the N collection devices, and an arrangement position of the first collection device is closer to a primary collection device in the N collection devices than an arrangement position of the second collection device, or the first collection device is the primary collection device. That the computing device determines image adjustment parameters of the N collection devices based on skeletal features extracted from the N images may include: The computing device determines a target cropped area of the second image collection device based on a skeletal feature extracted from the first front image and a skeletal feature extracted from the second front image, where the target cropped area is an area of the frame image in a collected image of the second collection device.

In an embodiment, the operation of determining, by the computing device, a target cropped area of the second image collection device may include: The computing device determines an adjacent transformation relationship between the first front image and the second front image; the computing device determines, based on the adjacent transformation relationship, a primary-secondary transformation relationship of the second front image relative to a primary collected image of the primary collection device; and the computing device determines the target cropped area of the second image collection device based on the primary-secondary transformation relationship.

According to a third aspect, an embodiment of this application provides a control device including a processor and a memory. The processor is coupled to the memory.

The memory is configured to store a program.

The processor is configured to execute the program in the memory, so that the processor performs the method according to the first aspect.

According to a fourth aspect, an embodiment of this application provides a computing device including a processor and a memory. The processor is coupled to the memory.

The memory is configured to store a program.

The processor is configured to execute the program in the memory, so that the processor performs the method according to the second aspect.

According to a fifth aspect, an embodiment of this application provides a chip, including at least one processor and an interface.

The interface is configured to provide program instructions or data for the at least one processor.

The at least one processor is configured to execute the program instructions, to implement the method according to the first aspect or the second aspect.

According to a sixth aspect, an embodiment of this application provides a computer-readable storage medium. The computer-readable storage medium stores a computer program. When the computer program is executed, the method according to the first aspect or the second aspect is implemented.

According to a seventh aspect, an embodiment of this application provides a computer program product. The computer program product includes computer program code, and when the computer program code is run, the method according to the first aspect or the second aspect is implemented.

For beneficial effects of the second aspect to the seventh aspect, refer to the first aspect. Details are not described herein again.

BRIEF DESCRIPTION OF DRAWINGS

FIG. 4 is a flowchart of a parameter determining method according to an embodiment of this application;

DETAILED DESCRIPTION

First, some nouns or terms used in this application are explained and described, and the nouns or terms are also used as a part of the present application.

(1) Collection device calibration: Determine a pose relationship between collection devices and a transformation relationship between imaging planes of a plurality of collection devices.

(2) Rough calibration: Adjust poses of a plurality of collection devices, so that the plurality of collection devices point to a preset center focus of a free viewpoint.

(3) Fine calibration: Determine a transformation relationship between imaging planes of a plurality of collection devices, and adjust images collected by the plurality of collection devices based on the transformation relationship, so that a smooth and stable switching effect between the plurality of images is achieved.

Figure 1:
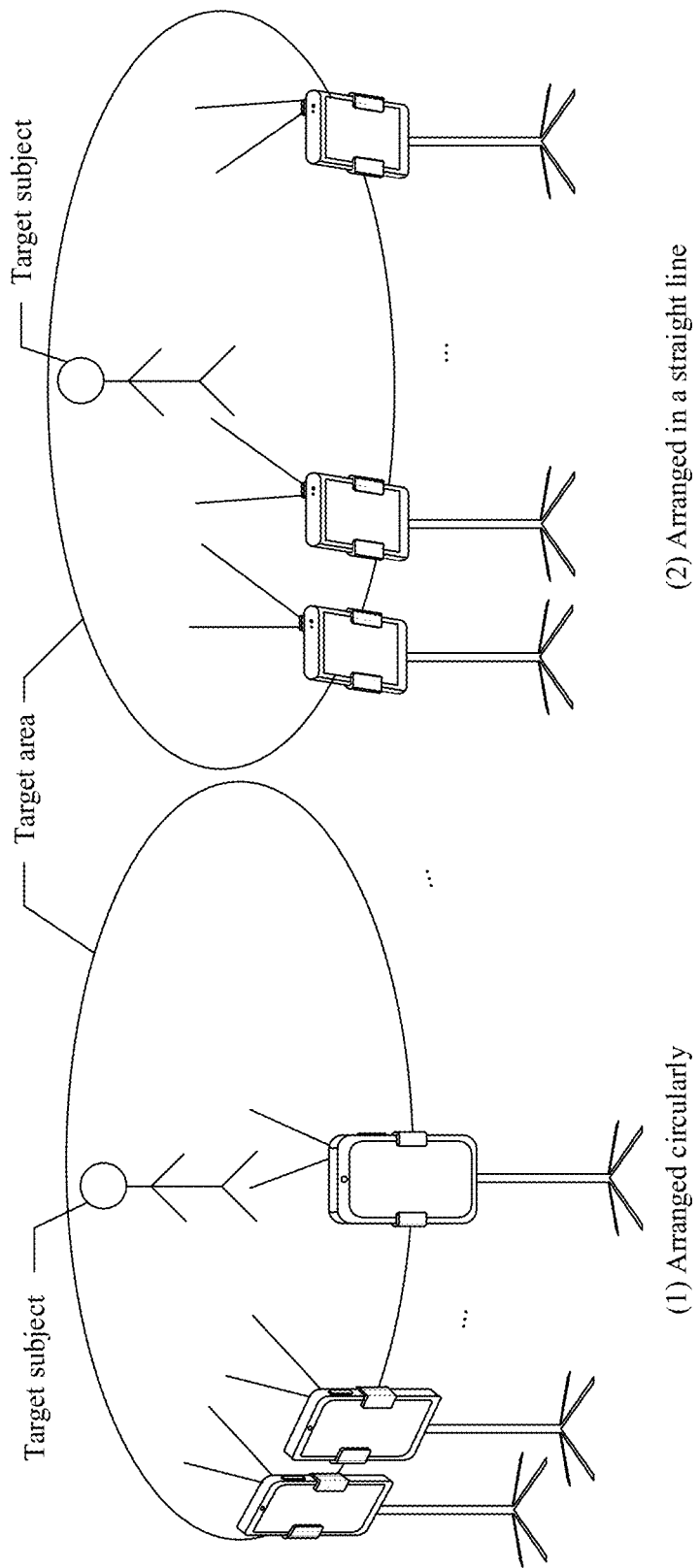
FIG. 1 is a schematic diagram of a scenario of a free viewpoint video.

1. Application Architecture of the Method Shown in Embodiments of this Application FIG. 1 is a schematic diagram of a scenario of a free viewpoint video. As shown in FIG. 1, a plurality of image collection devices are arranged around a target area, and lenses of the plurality of image collection devices point to a target subject in the target area. In an embodiment, by using the scenario shown in FIG. 1, offline generation of a free viewpoint video and/or real-time live broadcast of the free viewpoint video may be implemented.

In an embodiment, an arrangement manner of the plurality of collection devices may be arranged circularly. In addition, the plurality of collection devices may alternatively be arranged in another arrangement manner, for example, arranged in a straight line, provided that the plurality of collection devices are arranged around the target area. This is not limited herein.

Figure 2:
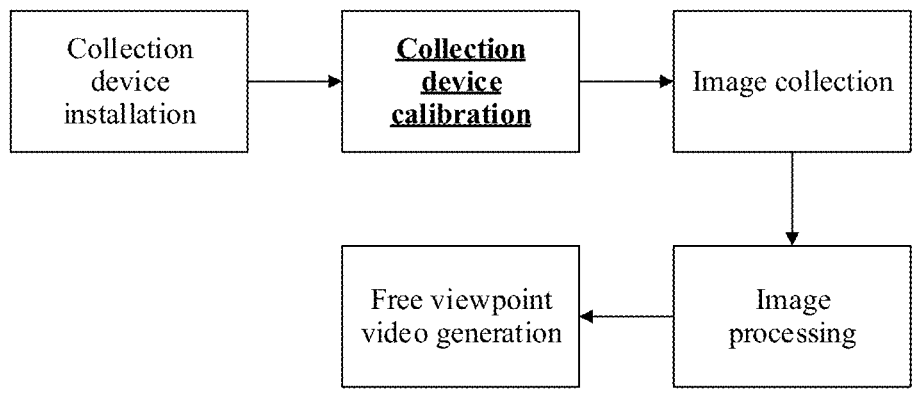
FIG. 2 is a flowchart of obtaining a free viewpoint video.

In the scenario shown in FIG. 1, a free viewpoint video may be obtained by using a procedure shown in FIG. 2. FIG. 2 is a system flowchart of a parameter determining method according to an embodiment of this application. As shown in FIG. 2, a free viewpoint video needs to be obtained by using a procedure of collection device installation, collection device calibration, image collection, image processing, and free viewpoint video generation.

Generally, in a process of collection device calibration, an extrinsic parameter and an intrinsic parameter of the collection device need to be determined. Because complex calculation needs to be performed to obtain the extrinsic parameter and the intrinsic parameter, and obtaining each collected image used for calculation involves pose adjustment of the collection device, operations of a process of collection device calibration are complex. As a result, efficiency is low.

To resolve the foregoing disadvantage, an embodiment of this application provides a parameter determining method, to automatically determine an image adjustment parameter of a collection device, and obtain a frame image of a free viewpoint video based on the image adjustment parameter. This method does not require complex calculation and is easy to operate. Therefore, efficiency of a process of collection device calibration can be improved.

Figure 3:
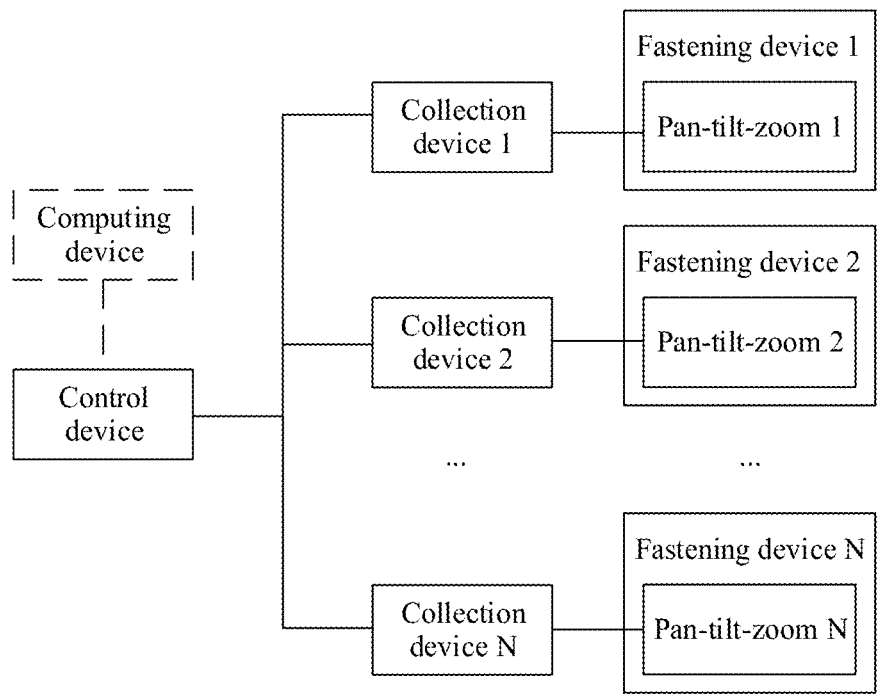
FIG. 3 is a schematic diagram of a system architecture of a parameter determining method according to an embodiment of this application.

FIG. 3 is a schematic diagram of a system architecture according to an embodiment of this application. The architecture includes a control device and N collection devices.

In the architecture shown in FIG. 3, the N collection devices are configured to collect images of a target subject, and each of the N collection devices is supported by a pan-tilt-zoom on a fastening device. N is a positive integer greater than 1. An arrangement manner of fastening devices (pan-tilt-zooms) determines an arrangement manner of the collection devices. For a specific arrangement manner, refer to the descriptions of FIG. 1. Details are not described herein again.

The control device is configured to determine image adjustment parameters of the N collection devices based on the images collected by the N collection devices, to implement fine calibration of the collection devices. A frame image of a free viewpoint video can be obtained by using the image adjustment parameter determined through fine calibration.

In an embodiment, the control device may further exchange data with a computing device; and a process of determining the image adjustment parameters of the N collection devices (a fine calibration process) may be implemented on the control device or the computing device. This is not limited herein.

The pose of the collection device can be adjusted by adjusting the pan-tilt-zoom. In an embodiment, the control device may further determine an adjustment angle of the pan-tilt-zoom, and deliver the adjustment angle to each pan-tilt-zoom, so as to adjust the poses of the N collection devices and implement rough calibration of the collection devices.

In this embodiment of this application, the collection device is a device that has an image collection function and a data transmission function, for example, may be a mobile phone. In addition to the mobile phone, the collection device may be a device such as a tablet computer (tablet personal computer (PC)). This is not limited herein.

In this embodiment of this application, the control device is a device that has a data processing capability, for example, may be a mobile phone. In addition to the mobile phone, the control device may be a device such as a personal digital assistant (PDA) or a tablet computer. This is not limited herein.

In this embodiment of this application, the computing device is a device that has a data processing capability, for example, may be a server. In addition to the server, the control device may be a computing resource such as a cloud. This is not limited herein.

2. A Parameter Determining Method According to an Embodiment of this Application Refer to the flowchart shown in FIG. 4. Based on the system architecture shown in FIG. 3, an embodiment of this application provides a parameter determining method, including the following operations.

401: A control device controls poses of a plurality of pan-tilt-zooms, so that lenses of N collection devices on the plurality of pan-tilt-zooms point to a target subject in a target area.

To obtain a free viewpoint video, image centers of the N collection devices should point to a same point, and the point is a center focus of a free viewpoint.

The control device may determine adjustment angles of the N collection devices based on images collected by the N collection devices, to control the poses of the plurality of pan-tilt-zooms, so that the lenses of the N collection devices all point to the center focus of the free viewpoint.

402: The control device obtains N images.

In this embodiment of this application, operation 401 is also referred to as rough calibration of the collection device, and a rough calibration process is used to adjust a pose of the collection device. After the poses of the N collection devices are determined through the rough calibration process, fine calibration can be performed on the N collection devices. A fine calibration process is used to determine a transformation relationship between imaging planes of the plurality of collection devices, and adjust the images collected by the plurality of collection devices based on the transformation relationship, so that a smooth and stable switching effect between the plurality of images is achieved.

To implement fine calibration, the control device needs to obtain N images, to determine a transformation relationship between imaging planes of the plurality of collection devices based on the N images. Each of the N images is one frame of image collected by each of the N collection devices for the target subject.

403: The control device determines image adjustment parameters of the N collection devices, where the image adjustment parameters are determined based on skeletal features extracted from the N images.

The control device determines the image adjustment parameters of the N collection devices based on the N images obtained in operation 402. The image adjustment parameters are determined based on the skeletal features extracted from the N images.

In an embodiment, the control device may extract the skeletal features from the N images, and determine a transformation relationship between images of different collection devices based on the skeletal features. Based on the transformation relationship, an image error between images collected by different collection devices may be eliminated. The image error refers to a transformation relationship other than left/right translation in the foregoing transformation relationship.

The control device may determine the image adjustment parameter used to eliminate the image error, and process each collection device by using a corresponding image adjustment parameter, so that a plurality of obtained images can implement a smooth and stable switching effect, thereby implementing an effect of a free viewpoint.

In this embodiment of this application, a transformation relationship between images collected by different collection devices is determined by extracting a skeletal feature, to eliminate an image error between the images. The device can automatically (1) extract a skeletal feature, (2) determine a transformation relationship, and (3) determine an image adjustment parameter. Therefore, only the images collected by the N collection devices need to be input to the device in the calibration process. It can be learned that, compared with a conventional calibration method, a calibration process in the method in this embodiment of this application is simpler, and calibration personnel can complete calibration without mastering professional calibration knowledge.

In addition, in comparison with a process of determining an extrinsic parameter and an intrinsic parameter in a conventional calibration process, operation complexity is low in an operation process such as (1) extracting a skeletal feature, (2) determining a transformation relationship, and (3) determining an image adjustment parameter. Therefore, computing power of a device can be saved.

It can be learned from the foregoing description that, when the images collected by the N collection devices are input to the device, the N collection devices may be calibrated by (1) extracting a skeletal feature, (2) determining a transformation relationship, and (3) determining an image adjustment parameter. In an embodiment, the foregoing three operations (operation 403) may be implemented by the control device. In addition, the foregoing three operations may alternatively be transplanted to another device for implementation, to reduce a computing power requirement or computing power consumption of the control device.

In an embodiment, in the system architecture shown in FIG. 3, the foregoing three operations may be transplanted to the computing device for implementation. In this case, the control device may transmit the N images obtained in operation 402 to the computing device, and the computing device completes the foregoing three operations to obtain the image adjustment parameter, so as to calibrate the N collection devices.

1. Rough Calibration Method According to an Embodiment of this Application

Figure 5:
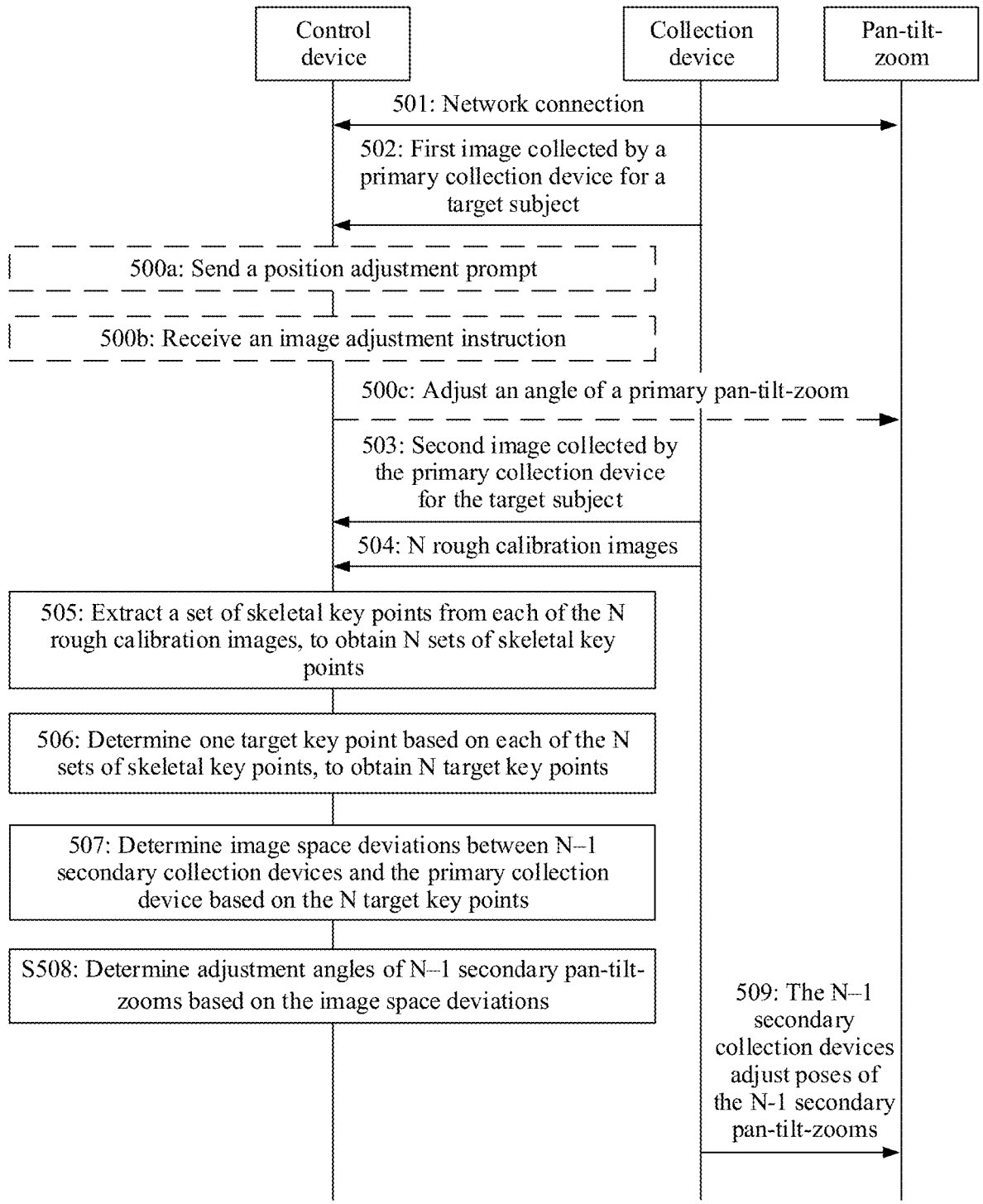
FIG. 5 is a flowchart of rough calibration of a parameter determining method according to an embodiment of this application.

In this embodiment of this application, operation 401 is alternatively referred to as a rough calibration process of the collection device. In an embodiment, the rough calibration process may alternatively be implemented by performing an operation on the skeletal feature. Refer to FIG. 5. Operation 401 may be implemented by using a procedure shown in FIG. 5. The procedure includes the following operations.

501: The control device, the N collection devices, and the pan-tilt-zooms are connected to a network.

In the rough calibration process, the control device needs to obtain the images collected by the N collection devices, and further needs to implement control on the pose of the pan-tilt-zoom. Therefore, a network connection needs to be implemented between the control device and the N collection devices, and a network connection further needs to be implemented between the N collection devices and corresponding N pan-tilt-zooms. The N pan-tilt-zooms are in a one-to-one correspondence with the N collection devices.

In an embodiment, the control device may be connected to the N collection devices by using a wireless fidelity (wireless fidelity, Wi-Fi) technology network. In addition to the Wi-Fi network, the control device may alternatively be connected to the N collection devices by using a network such as Bluetooth. This is not limited herein.

In an embodiment, the N collection devices may be connected to the corresponding N pan-tilt-zooms by using a Bluetooth network. In addition to the Bluetooth network, the N collection devices may alternatively be connected to the corresponding N pan-tilt-zooms by using a Wi-Fi network, a wired connection (for example, a universal serial bus (universal serial bus, USB)), or the like. This is not limited herein.

In an embodiment, after operation 501 and before operation 502, the control device may send a uniform focal length parameter to each collection device, to complete focal length setting of the collection device.

502: The control device obtains a first image collected by a primary collection device for the target subject.

In this embodiment of this application, the N collection devices may include one primary collection device and N−1 secondary collection devices.

In this embodiment of this application, the target subject is used as a reference object for calibration. Therefore, the primary collection device may collect an image of the target subject, and transmit the image to the control device. The image is referred to as a first image. Correspondingly, the control device obtains the first image from the primary collection device.

503: The control device obtains a second image collected by the primary collection device for the target subject.

In an actual use process of a free viewpoint technology, if an image center (that is, a center focus of a free viewpoint) of a collection device is aligned with a preset target position, an imaging effect of an obtained free viewpoint video is better. In this embodiment of this application, a center focus of a free viewpoint is determined by using the target subject. Therefore, an image center of the primary collection device needs to be aligned with a target position. If the image center of the primary collection device is not aligned with the target position, a position relationship between the primary collection device and the target subject needs to be adjusted.

The target position is a position that is aligned when a free viewpoint video is played and that is preset by calibration personnel, for example, a face or a geometric center of a person. This is not limited herein.

In an embodiment, a position of the target subject and/or a pose of a primary pan-tilt-zoom may be adjusted, so that the target subject is located at a target position in the image collected by the primary collection device, thereby implementing the foregoing alignment.

After alignment is implemented through adjustment, the primary collection device may collect an image of the target subject, and transmit the image to the control device. The image is referred to as a second image.

In an embodiment, if the foregoing alignment is implemented on the first image, operation 503 does not need to be performed. Therefore, operation 503 may be an optional operation.

504: The control device obtains N rough calibration images.

The control device may obtain images that are collected by each of the N collection devices for the target subject at a same moment. The N images are referred to as rough calibration images. A rough calibration image collected by the primary collection device is referred to as a primary rough calibration image, and a rough calibration image collected by a secondary collection device is referred to as a secondary rough calibration image.

505: The control device extracts N sets of skeletal key points from the N rough calibration images.

Figure 6:
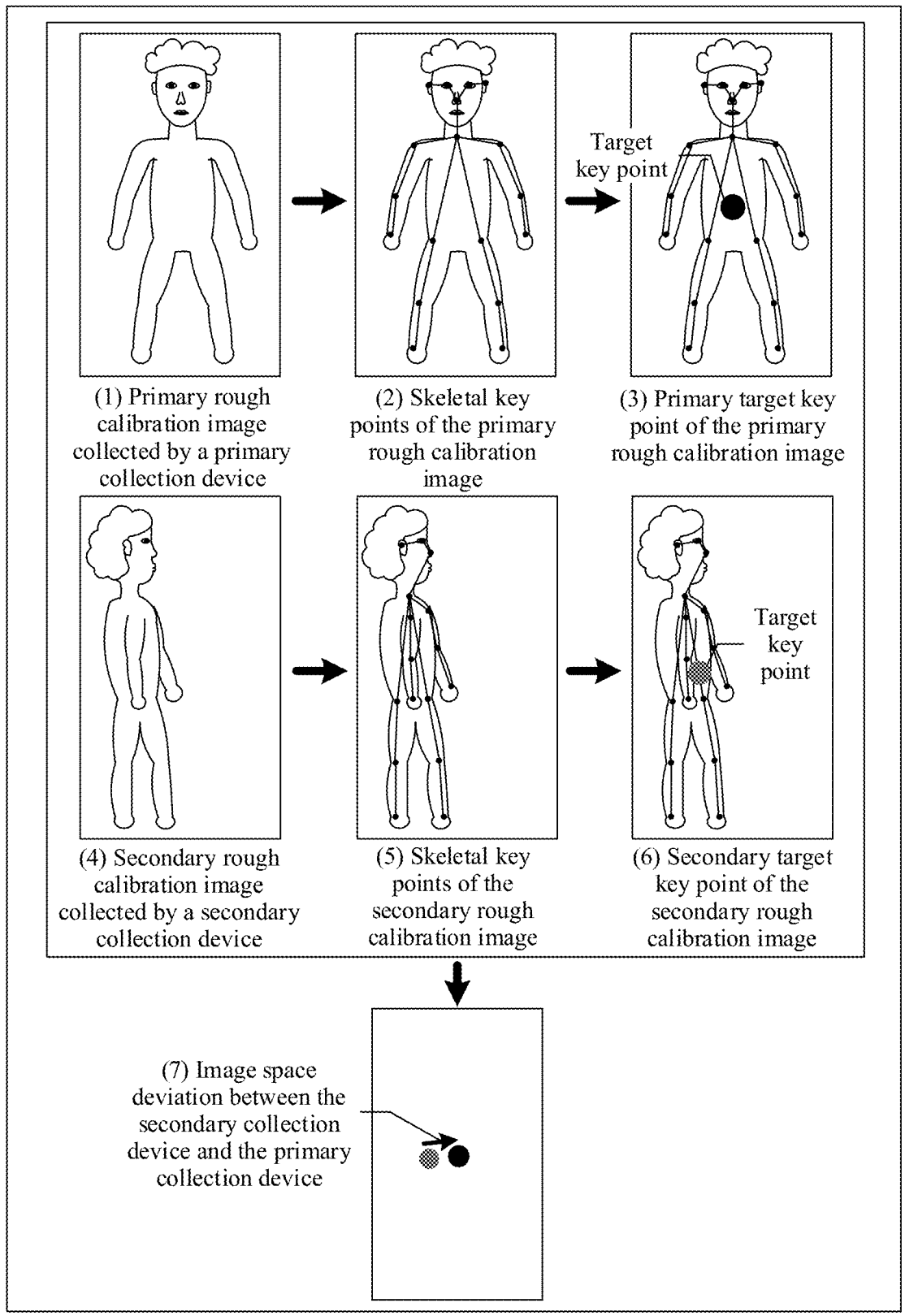
FIG. 6 is a schematic diagram of a process of rough calibration of a parameter determining method according to an embodiment of this application.

As shown in (2) and (5) in FIG. 6, the control device may extract one set of skeletal key points of the primary rough calibration image and N−1 sets of skeletal key points of the N−1 secondary rough calibration images.

It should be noted that (5) in FIG. 6 is an example of a process of extracting a skeletal key point from a rough calibration image, and does not limit a quantity of rough calibration images.

It should be noted that, in FIG. 6, a person is used as an example of a target subject. When the target subject is another subject other than the person, a skeletal key point may still be extracted from the target subject. This is not limited herein.

506: The control device determines N target key points based on the N sets of skeletal key points.

The control device may determine, based on the N sets of skeletal key points extracted in operation 507, a target key point corresponding to each set of skeletal key points, to obtain the N target key points. A target key point determined based on the skeletal key point extracted from the primary rough calibration image is referred to as a primary target key point, and a target key point determined based on the skeletal key point extracted from the secondary rough calibration image is referred to as a secondary target key point.

In an embodiment, the target key point may be shown in FIG. 6, and is a geometric center of a corresponding set of skeletal key points. In addition to the geometric center of the skeletal key points, there may be another relationship between the target key point and the corresponding skeletal key point. For example, when the image center of the primary collection device is aligned with a face in operation 505, the target key point may alternatively be a center position of the face in the skeletal key point. This is not limited herein.

507: The control device determines image space deviations between the N−1 secondary collection devices and the primary collection device based on the N target key points.

For each secondary target key point, the control device may determine a key point deviation between the secondary target key point and the primary target key point, where the key point deviation is an image space deviation between the corresponding secondary collection device and the primary collection device.

508: The control device determines adjustment angles of the N−1 secondary pan-tilt-zooms based on the image space deviations.

For each secondary collection device, the control device may determine a mapping relationship between a variation of a physical space angle of the secondary collection device and a variation of a corresponding pixel position in a shot image, so as to determine the adjustment angles of the N−1 secondary pan-tilt-zooms based on the image space deviations and the mapping relationship.

509: The N−1 secondary collection devices adjust poses of the N−1 secondary pan-tilt-zooms.

The N−1 secondary collection devices may control the poses of the corresponding N−1 secondary pan-tilt-zooms based on the adjustment angles, so as to control the poses of the N−1 secondary collection devices, so that lenses of the N collection devices all point to the target subject in the target area.

In an embodiment, the control device may adjust the pose of the secondary pan-tilt-zoom by using a speed-position two-loop control method. In an embodiment, the control device may determine a transfer function of a pan-tilt-zoom motor in a pan-tilt-zoom control system based on a hardware structure and a physical model of the pan-tilt-zoom motor. Control parameters corresponding to a position loop and a speed loop of the system are determined by using a parameter adjustment method of the control system. Therefore, a transfer function of the entire closed-loop control system is determined, and the adjustment angle that is of the pan-tilt-zoom and that is determined in operation 508 is used as control input to complete pan-tilt-zoom pose adjustment.

In the rough calibration method shown in this embodiment of this application, lenses of a plurality of collection devices are aligned with a center focus of a free viewpoint by (1) extracting a skeletal key point, (2) determining a target key point, (3) determining an image space deviation based on the key point, and (4) determining an adjustment angle of a pan-tilt-zoom based on the image space deviation. Because the foregoing four operations (operations 505 to 508) can be automatically performed by the device, in a calibration process, only the images collected by the N collection devices need to be input to the device. Compared with a conventional calibration method, a process of aligning the lenses of the plurality of collection devices is simpler, and calibration personnel can complete alignment of the plurality of lenses without mastering professional calibration knowledge. In addition, in the conventional calibration method, rough calibration is implemented by manually adjusting a pose of a pan-tilt-zoom, and accuracy of alignment of the plurality of lenses is related to experience of an operator. In the method in this embodiment of this application, the device automatically completes rough calibration, and precision of the pan-tilt-zoom is high. Therefore, accuracy of alignment of the plurality of lenses is higher compared with manual adjustment.

In an embodiment, the foregoing four operations may be transplanted to the computing device or any collection device for implementation. In this case, the control device may transmit the N rough calibration images obtained in operation 504 to the computing device/collection device. The computing device/collection device completes the foregoing four operations to determine the adjustment angle of the secondary pan-tilt-zoom, and then the computing device/collection device delivers the adjustment angle of the secondary pan-tilt-zoom to each secondary pan-tilt-zoom, to implement alignment of the plurality of lenses.

1.1. Rough Calibration Method Implemented Through Human-Computer Interaction According to an Embodiment of this Application In an embodiment, the control device may further implement interaction with calibration personnel through an operation interface shown in FIG. 7. The following describes a use process of the operation interface.

501: The control device, the N collection devices, and the pan-tilt-zooms are connected to a network.

For operation 501, refer to the descriptions of the foregoing embodiment, and details are not described herein again.

502: The control device obtains a first image collected by a primary collection device for the target subject.

Figure 7:
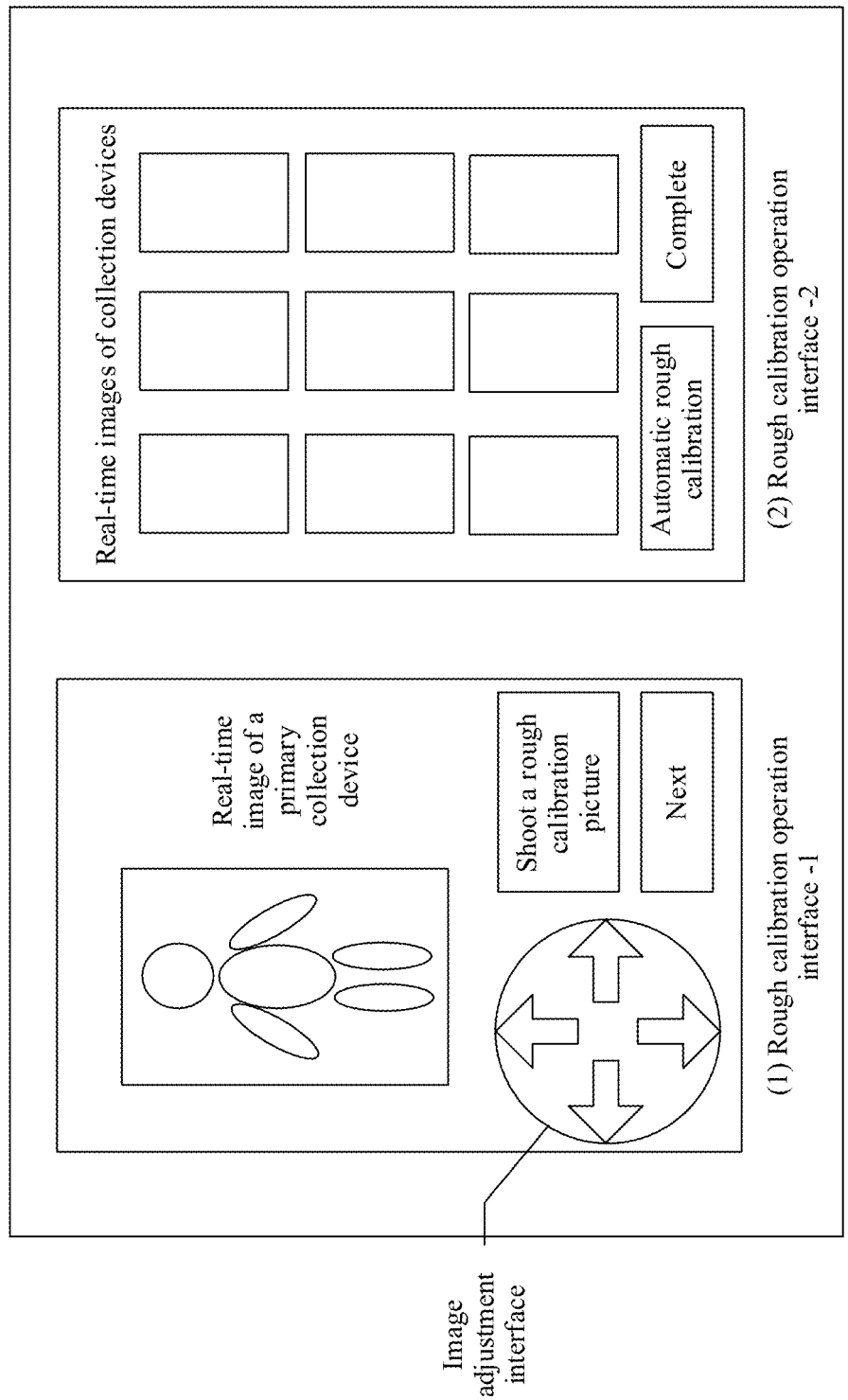
FIG. 7 is a schematic diagram of a rough calibration operation interface of a parameter determining method according to an embodiment of this application.

The control device obtains the first image. As shown in FIG. 7, the first image may be displayed in a real-time image box of the primary collection device in a rough calibration operation interface-1. The calibration personnel can obtain a real-time image of the primary collection device by using the image box.

500a: The control device sends a position adjustment indication.

In an embodiment, the calibration personnel may be a target subject and hold the control device. The calibration personnel can determine the real-time image of the primary collection device through the rough calibration operation interface-1. In this case, the real-time image is the first image. To implement alignment between the image center of the primary collection device and the target position (for details, refer to the descriptions of operation 503), the control device may send a position adjustment indication.

The position adjustment indication indicates adjustment of a position of the target subject, and/or indicates adjustment of the pose of the primary pan-tilt-zoom, so as to implement adjustment of the image of the primary collection device, so that the target subject is located at the target position in the image of the primary collection device.

It should be noted that the calibration personnel and the target subject may be different subjects, and this is not limited herein.

In this embodiment of this application, the target subject may be a person, or may be an animal, a model, or the like in addition to a person. This is not limited herein.

500b: The control device receives an image adjustment instruction.

In an embodiment, the calibration personnel may adjust the pose of the primary pan-tilt-zoom by tapping an image adjustment interface in the rough calibration operation interface-1.

The calibration personnel tap the image adjustment interface, so that the control device obtains a corresponding image adjustment instruction.

500c: The control device adjusts an angle of the primary pan-tilt-zoom.

The control device may control, according to the image adjustment instruction obtained in operation 500b, the primary pan-tilt-zoom to adjust an angle, so as to adjust the pose of the primary collection device, thereby adjusting the image of the primary collection device.

503: The control device obtains a second image collected by the primary collection device for the target subject.

Through the foregoing operations 502 to 500c, the image of the primary collection device displayed in the rough calibration operation interface-1 changes, and operations 500b and 500c may be repeatedly performed until the calibration personnel confirm that the image of the primary collection device meets an expected requirement, that is, the second image collected by the primary collection device for the target subject meets the expected requirement. Then, the calibration personnel can tap "Shoot a rough calibration picture" in the rough calibration operation interface-1 to perform next rough calibration.

In an embodiment, the rough calibration operation interface-1 may further include a "Next" button. The calibration personnel may tap the button to switch to a rough calibration operation interface-2.

504: The control device obtains N rough calibration images.

The calibration personnel tap "Shoot a rough calibration picture" and "Next" in the rough calibration operation interface-1. A display of the control device displays the rough calibration operation interface-2.

The calibration personnel tap "Automatic calibration" in the rough calibration operation interface-2, so that the control device obtains the N rough calibration images. For descriptions of obtaining the N rough calibration images, refer to operation 504 in the foregoing embodiment.

505: The control device extracts N sets of skeletal key points from the N rough calibration images.

506: The control device determines N target key points based on the N sets of skeletal key points.

507: The control device determines image space deviations between the N−1 secondary collection devices and the primary collection device based on the N target key points.

508: The control device determines adjustment angles of the N−1 secondary pan-tilt-zooms based on the image space deviations.

509: The N−1 secondary collection devices adjust poses of the N−1 secondary pan-tilt-zooms.

For operations 505 to 509, refer to the descriptions of the foregoing embodiment, and details are not described herein again.

In an embodiment, at least one of the N sets of skeletal key points, the N target key points, and the image space deviations determined in operations 505 to 509 may be displayed in a real-time image of each collection device in the rough calibration operation interface-2. This is not limited herein.

Images displayed in the rough calibration operation interface-1 and the rough calibration operation interface-2 shown in FIG. 7 are both real-time images, and are used for visual interaction and perception of the calibration personnel to determine a current pose of a collection device.

By using the interaction interface shown in FIG. 7, the calibration personnel can implement automatic alignment of the lenses of the plurality of collection devices through simple operations, thereby improving intelligence of the calibration process and greatly reducing difficulty of adjusting the lenses by the calibration personnel.

2. Fine Calibration Method According to an Embodiment of this Application

Figure 8:
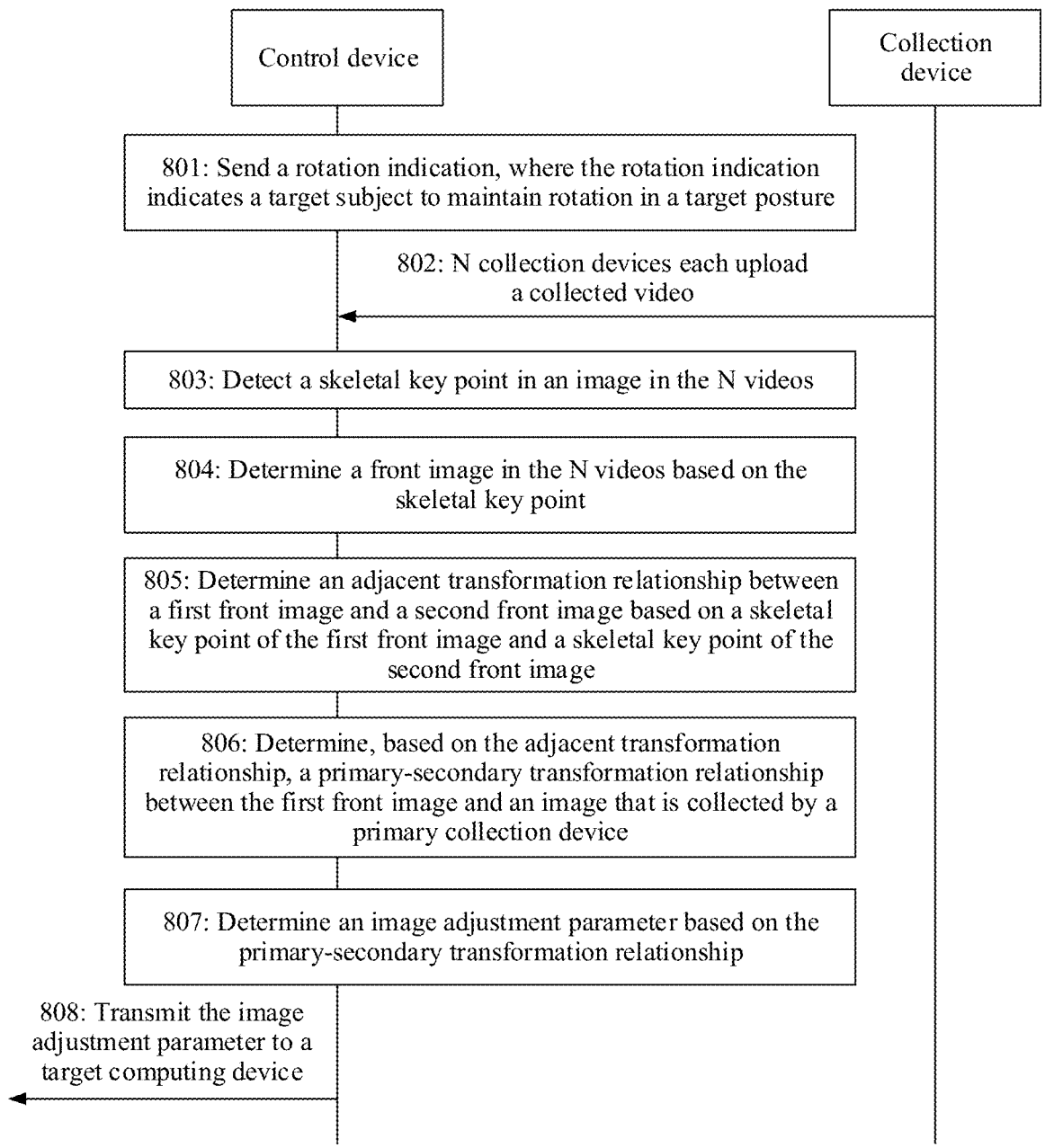
FIG. 8 is a flowchart of fine calibration of a parameter determining method according to an embodiment of this application.

In this embodiment of this application, operations 402 and 403 are alternatively referred to as a fine calibration process of the collection device. In an embodiment, a specific implementation process of the fine calibration process may be implemented by using a procedure shown in FIG. 8. The procedure includes the following operations.

801: The control device sends a rotation indication, where the rotation indication indicates the target subject to maintain rotation in a target posture.

Figure 10:
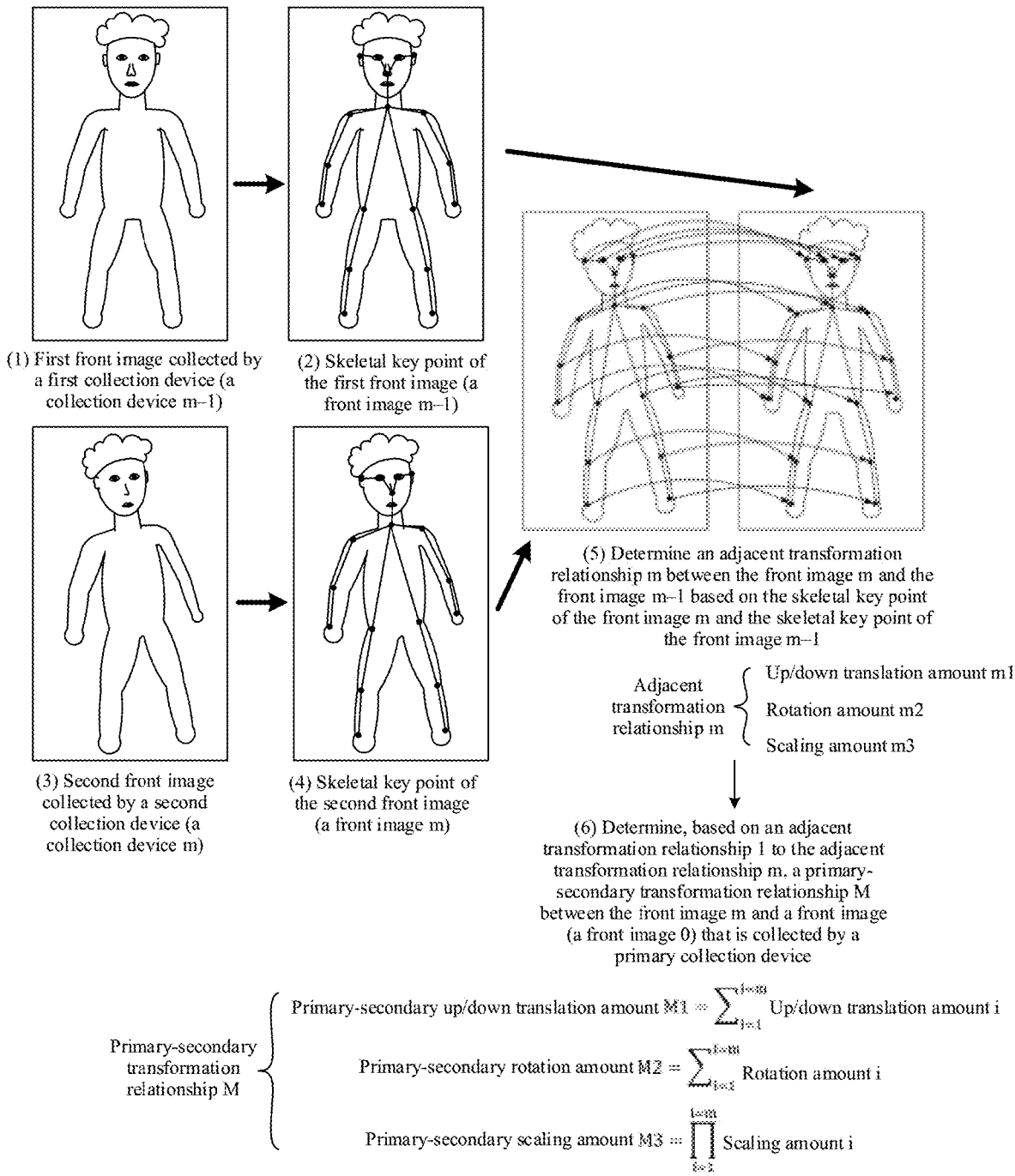
FIG. 10 is a schematic diagram of a process of fine calibration of a parameter determining method according to an embodiment of this application.

In an embodiment, as shown in FIG. 10, the target posture may include a posture corresponding to an A-shaped skeletal feature. In addition, the target posture may be another posture, for example, a posture corresponding to a T-shaped skeletal feature. This is not limited herein.

In an embodiment, the rotation indication may indicate the target subject to rotate at a uniform speed or a non-uniform speed, or indicate the target subject to rotate in a unit of a target angle. The target angle may be any angle less than or equal to 120°, for example, may be 15°, 30°, 60°, or 90°. This is not limited herein.

802: The N collection devices each upload a collected video to the control device.

In a process in which the target subject rotates, the N collection devices each record a video for the target subject, and transmit the video to the control device. Correspondingly, the control device obtains the videos recorded by the N collection devices for the target subject.

803: The control device detects a skeletal key point in an image in the N videos.

For the video uploaded by each collection device, the control device detects a skeletal key point in an image in the video.

804: The control device determines a front image in the N videos based on the skeletal key point.

For the video uploaded by each collection device, the control device may determine a front image from an image of the video, to determine N front images. Each of the N front images is one image collected by each of the N collection devices for the target subject. The front image is an image with a largest skeletal key point distribution range in all images of a video. If two images have a largest distribution range, an image in which a largest quantity of skeletal key points can be detected is selected (for example, if the target subject is a person, a skeletal key point of a face cannot be detected in an image of a back).

It should be noted that, in this embodiment of this application, the front image is not necessarily an image that the collection device collects for the target subject when directly facing the target subject, and a specific angle is allowed between a front of the target subject and the collection device. This is not limited herein.

805: The control device determines an adjacent transformation relationship between the first front image and the second front image.

Figure 9:
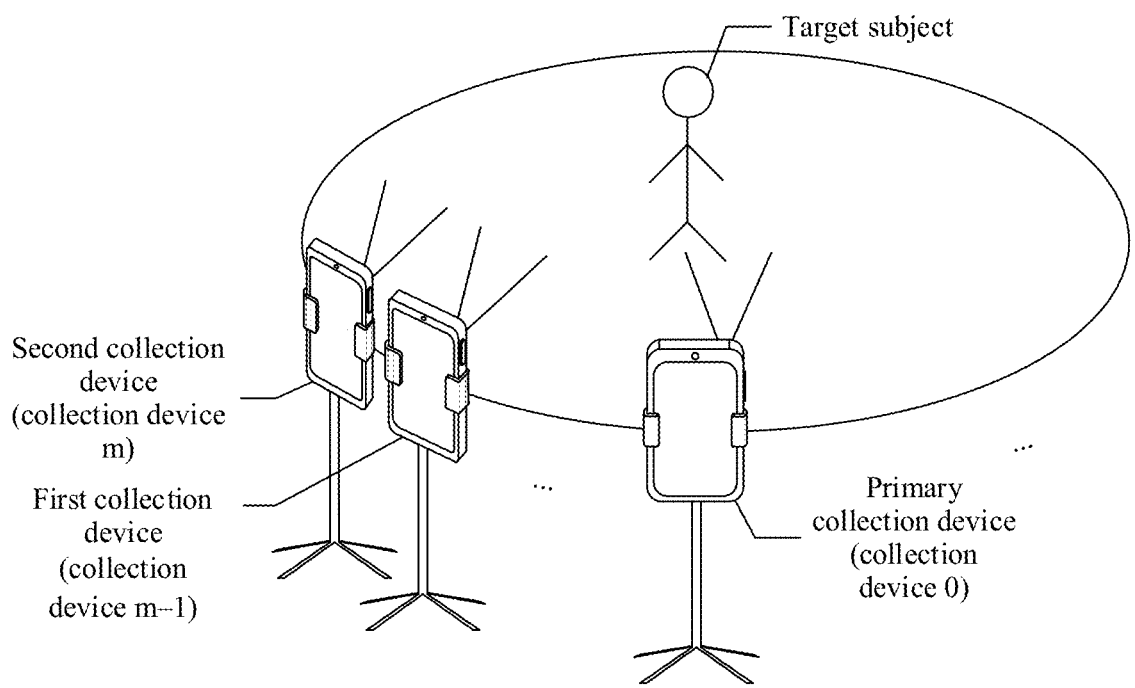
FIG. 9 is a schematic diagram of a scenario of a parameter determining method according to an embodiment of this application.

Refer to FIG. 9. In an embodiment of this application, the first collection device and the second collection device that are located at adjacent arrangement positions are arranged on a same side of the primary collection device. For example, in FIG. 9, both the first collection device and the second collection device are located on a left side of the primary collection device. An arrangement position of the first collection device is closer to the primary collection device than an arrangement position of the second collection device. A number of the primary collection device is 0. The collection devices on this side are numbered in sequence. If a number of the second collection device is m, a number of the first collection device is m−1. 1≤m≤N−1. Correspondingly, a front image of the first collection device is a front image m−1, and a front image of the second collection device is a front image m.

In an embodiment, if the second collection device is a collection device at an arrangement position adjacent to the primary collection device, the second collection device is a collection device 1, and the primary collection device is a collection device 0.

As shown in (5) in FIG. 10, the control device may determine an adjacent transformation relationship m between the front image m and the front image m−1 based on skeletal key points of the front image m and the front image m−1.

The adjacent transformation relationship m includes at least one of (1) an up/down translation amount m1, (2) a rotation amount m2, and (3) a scaling amount m3 of the front image m relative to the front image m−1.

806: The control device determines, based on the adjacent transformation relationship, a primary-secondary transformation relationship between the first front image and the image that is collected by the primary collection device.

The control device may determine a primary-secondary transformation relationship M between the front image m and a front image (a front image 0) of the primary collection device based on m adjacent transformation relationships (an adjacent transformation relationship 1 to the adjacent transformation relationship m) between the primary collection device (the collection device 0) and the second collection device (the collection device m).

The primary-secondary transformation relationship M includes at least one of (1) a primary-secondary up/down translation amount M1, (2) a primary-secondary rotation amount M2, and (3) a primary-secondary scaling amount M3 of the front image m relative to the front image 0. The foregoing M1, M2, and M3 are all deviations that need to be eliminated, and belong to a dither component in similarity transformation between two frames of images.

In this embodiment of this application, the primary-secondary up/down translation amount M1 is also referred to as an up/down translation parameter of the collection device m, the primary-secondary rotation amount M2 is also referred to as a rotation parameter of the collection device m, and the primary-secondary scaling amount M3 is also referred to as a scaling parameter of the collection device m.

A formula for calculating the primary-secondary transformation relationship is as follows:

(Formula 1: up/down translation parameter)

Primary–secondary up/down translation amount M1 =
$$\sum\nolimits_{i-1}^{i=m} \text{Up/down translation amount } i$$

-continued
(Formula 2: rotation parameter)
$$\text{Primary–secondary rotation amount M2} = \sum\nolimits_{i-1}^{i=m} \text{Rotation amount } i$$

(Formula 3: scaling parameter)
$$\text{Primary–secondary scaling amount M3} = \prod_{i-1}^{i=m} \text{Scaling amount } i$$

807: The control device determines an image adjustment parameter based on the primary-secondary transformation relationship.

In the foregoing descriptions, the primary-secondary transformation relationship M of the second collection device (the collection device m) includes at least one of (1) the primary-secondary up/down translation amount M1, (2) the primary-secondary rotation amount M2, and (3) the primary-secondary scaling amount M3 of the front image m relative to the front image 0. In this case, the control device may determine, based on the primary-secondary transformation relationship M, a cropped area of the front image m of the collection device m relative to the front image 0, and a dither component between the front image m and the front image 0 may be eliminated by using the cropped area. For each secondary collection device, a cropped area of a corresponding front image relative to the front image 0 may be determined. An intersection set of cropped areas corresponding to all of the secondary collection devices is obtained to obtain target cropped areas of the secondary collection devices, where the target cropped areas are used to eliminate an up/down translation error, a rotation error, and a scaling error between the collected images of the secondary collection device and the collection device 0.

The image adjustment parameters of the N−1 secondary collection devices are determined by performing operations 805 to 807. Therefore, for each secondary collection device, the determined target cropped area is used to eliminate an up/down translation error, a rotation error, and a scaling error between the collected images of the secondary collection device and the primary collection device. Therefore, through cropping in the corresponding target cropped areas, only horizontal displacement exists between the obtained images of the N collection devices. In this way, a smooth and stable switching effect may be achieved between these images and the image of the primary collection device.

808: The control device transmits the image adjustment parameter to a target computing device.

The control device separately transmits the corresponding image adjustment parameter to the target computing device, so that the target computing device crops, in a collecting process of the free viewpoint video based on the corresponding target cropped area, the image collected by each collection device. In an embodiment, the target computing device may be a cloud server. In addition to the cloud server, the target computing device may alternatively be the control device, the computing device, or another device. This is not limited herein.

According to the fine calibration method shown in this embodiment of this application, target cropped areas of a plurality of collection devices are determined by (1) extracting a skeletal key point from a video, (2) determining a front image based on the skeletal key point, (3) determining an adjacent transformation relationship, and (4) determining a primary-secondary transformation relationship based on the adjacent transformation relationship. Because the foregoing four operations (operations 803 to 807) can be automatically performed by the device, in the fine calibration process, only the videos collected by the N collection devices need to be input to the device. Compared with a conventional calibration method, a process of determining the image adjustment parameters of the plurality of collection devices is simpler, and calibration personnel can determine the plurality of image adjustment parameters without mastering professional calibration knowledge.

In an embodiment, after fine calibration is completed in operation 808, operations such as image collection, image processing, and free viewpoint video generation shown in FIG. 2 may be performed. After operation 808 and before image collection, the control device may send a unified parameter to each collection device and complete setting. These parameters include but are not limited to parameters related to video collection, such as a frame rate, a bit rate, and landscape/portrait orientation.

In an embodiment, based on the system architecture shown in FIG. 3, the foregoing four operations may be transplanted to the computing device for implementation. In this case, the control device may transmit the N videos obtained in operation 802 to the computing device, and the computing device completes the foregoing four operations to determine the image adjustment parameter.

2.1. Fine Calibration Method Implemented Through Human-Computer Interaction According to an Embodiment of this Application In an embodiment, the control device may further implement interaction with calibration personnel through an operation interface shown in FIG. 11. The following describes a use process of the operation interface.

801: The control device sends a rotation indication, where the rotation indication indicates the target subject to maintain rotation in a target posture.

Figure 11:
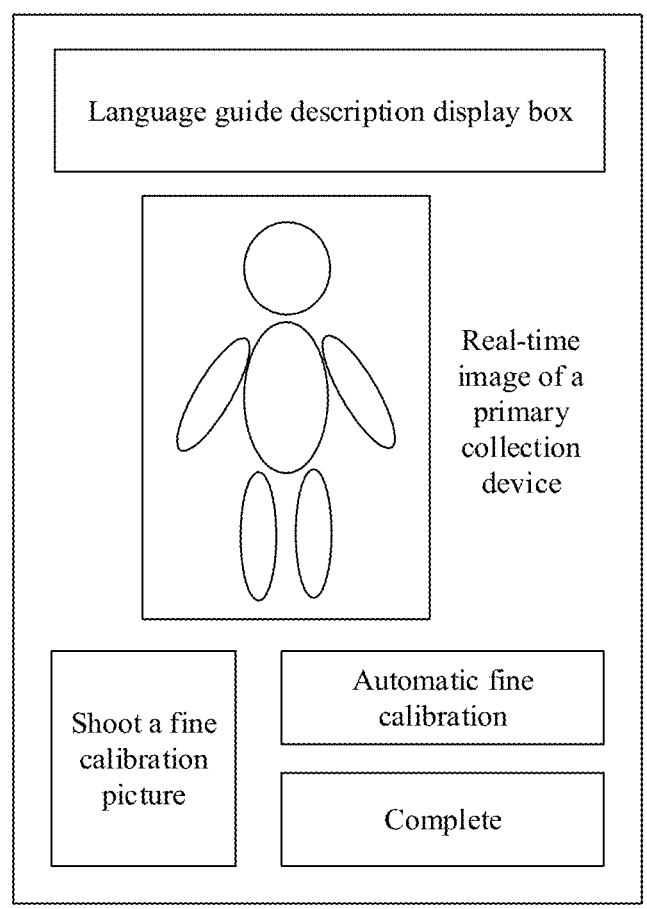
FIG. 11 is a schematic diagram of a fine calibration operation interface of a parameter determining method according to an embodiment of this application.

In the fine calibration process, the calibration personnel may tap "Shoot a fine calibration picture" in the fine calibration operation interface shown in FIG. 11 to start the fine calibration process.

The control device receives an instruction of shooting a fine calibration picture through the foregoing interface, and may display the rotation indication in a language guide description box in the fine calibration operation interface. The calibration personnel receive the rotation indication through the image box.

In an embodiment, the fine calibration operation interface may not include the language guide description box, and the control device may alternatively convey the rotation indication to the calibration personnel in another manner such as voice, which is not limited herein.

After receiving the instruction of shooting a fine calibration picture, the control device may deliver an image shooting instruction to the N collection devices, to obtain videos shot by the N collection devices.

802: The N collection devices each upload a collected video to the control device.

803: The control device detects a skeletal key point in an image in the N videos.

After obtaining the N videos, the control device may inform, by using the language guide description display box in the fine calibration operation interface, a voice prompt, or the like, the calibration personnel that the video obtaining operation is completed, and/or prompt the calibration personnel to perform a next operation of automatic fine calibration. After receiving the message, the calibration personnel may tap "Auto calibration" in the fine calibration operation interface. The control device automatically performs operations 803 to 808.

In an embodiment, the fine calibration operation interface may further include a "Complete" button. The calibration personnel may tap the "Complete" button to exit the fine calibration operation interface.

804: The control device determines a front image in the N videos based on the skeletal key point.

805: Determine, by the control device, an adjacent transformation relationship between the first front image and the second front image.

806: The control device determines, based on the adjacent transformation relationship, a primary-secondary transformation relationship between the first front image and the image that is collected by the primary collection device.

807: The control device determines an image adjustment parameter based on the primary-secondary transformation relationship.

808: The control device transmits the image adjustment parameter to a target computing device.

For operations 802 to 808, refer to the descriptions of the foregoing embodiment, and details are not described herein again.

By using the interaction interface shown in FIG. 11, the calibration personnel can implement automatic determining of the image adjustment parameters of the plurality of collection devices by performing simple operations according to guidance, and the calibration personnel do not need to calculate the parameters. This improves intelligence of the calibration process, and greatly reduces difficulty in determining the image adjustment parameters by the calibration personnel.

The foregoing describes the parameter determining method provided in embodiments of this application. The following describes a device that is configured to implement the foregoing parameter determining method and that is provided in embodiments of this application.

Figure 12:
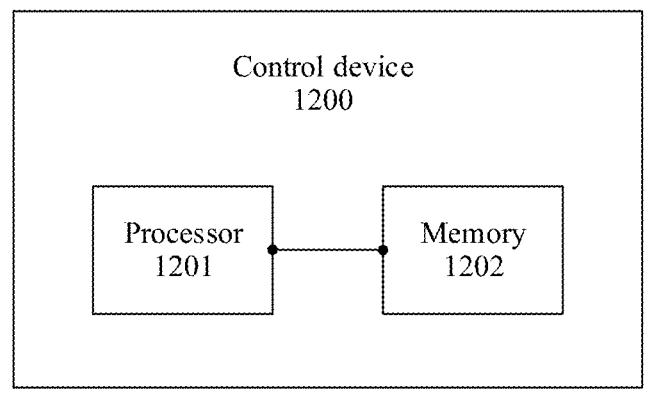
FIG. 12 is a schematic diagram of a structure of a control device according to an embodiment of this application.

Refer to FIG. 12. An embodiment of this application provides a control device 1200, including a processor 1201 and a memory 1202. The processor 1201 is coupled to the memory 1202.

The memory 1202 is configured to store a program.

The processor 1201 is configured to execute the program in the memory 1202, so that the processor 1201 performs operations performed by the control device in any one of the foregoing embodiments in FIG. 4 to FIG. 11, to implement a corresponding parameter determining method.

Figure 13:
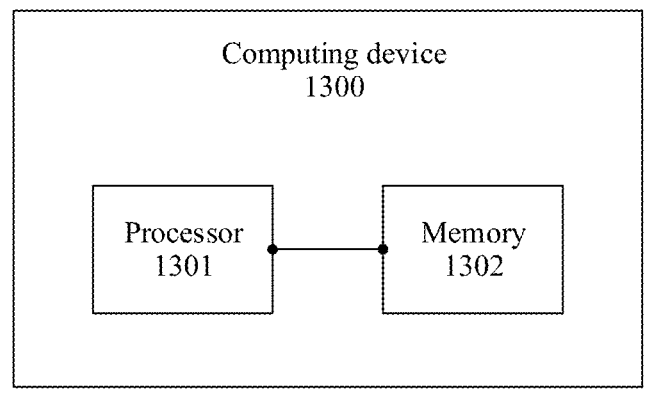
FIG. 13 is a schematic diagram of a structure of a computing device according to an embodiment of this application.

Refer to FIG. 13. An embodiment of this application provides a computing device 1300, including a processor 1301 and a memory 1302. The processor 1301 is coupled to the memory 1302.

The memory 1302 is configured to store a program.

The processor 1301 is configured to execute the program in the memory 1302, so that the processor 1301 performs operations performed by the computing device in any one of the foregoing embodiments in FIG. 4 to FIG. 11, to implement a corresponding parameter determining method.

Figure 14:
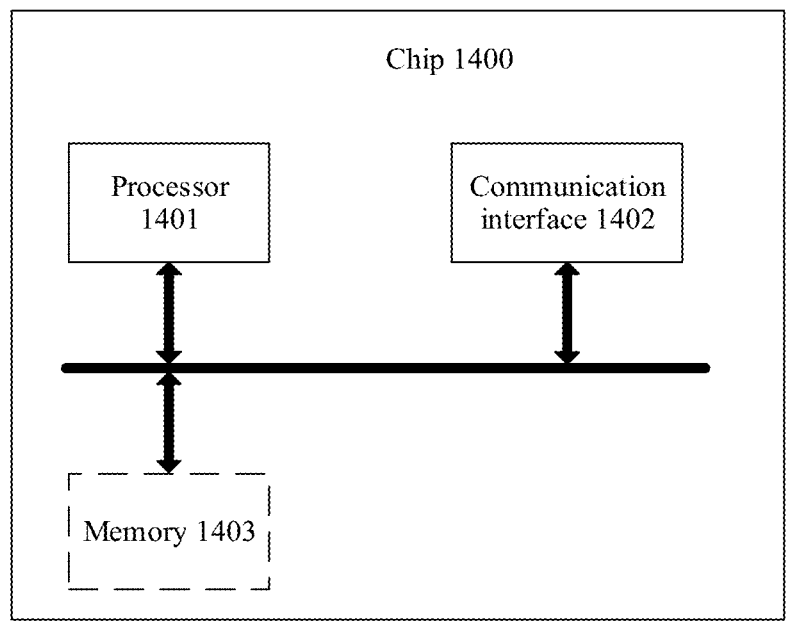
FIG. 14 is a schematic diagram of a structure of a chip according to an embodiment of this application.

Refer to FIG. 14. An embodiment of this application provides a chip 1400. The chip 1400 includes at least one processor 1401 and a communication interface 1402. The communication interface 1402 and the at least one processor 1401 are interconnected by using a line. The at least one processor 1401 is configured to run a computer program or instructions, to perform the parameter determining method corresponding to any one of the embodiments in FIG. 4 to FIG. 11.

The communication interface 1402 in the chip may be an input/output interface, a pin, a circuit, or the like.

In a possible implementation, the chip 1400 described above in this application further includes at least one memory 1403, and the at least one memory 1403 stores instructions. The memory 1403 may be a storage unit inside the chip, for example, a register or a cache, or may be a storage unit (for example, a read-only memory or a random access memory) of the chip.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A method of parameter determining for a control device, the method comprising:
    controlling poses of a plurality of pan-tilt-zooms, causing lenses of N collection devices on the plurality of pan-tilt-zooms to point to a target subject in a target area, wherein the N collection devices are arranged around the target area, and N is a positive integer greater than 1;
    sending a rotation indication that indicates the target subject to maintain rotation in a target posture;
    obtaining N images, wherein each of the N images is a frame of image collected by each of the N collection devices for the target subject; and
    determining image adjustment parameters of the N collection devices based on skeletal features extracted from the N images, wherein the image adjustment parameters are used to obtain a frame image of a free viewpoint video;
    wherein
    the N images comprise a first front image collected by a first collection device and a second front image collected by a second collection device, the first collection device and the second collection device are located at adjacent arrangement positions in the N collection devices, and (i) an arrangement position of the first collection device is closer to a primary collection device than an arrangement position of the second collection device, or (ii) the first collection device is the primary collection device; and
    determining the image adjustment parameters of the N collection devices comprises:
    determining a target cropped area of the second collection device based on a skeletal feature extracted from the first front image and a skeletal feature extracted from the second front image, wherein the target cropped area of the second collection device is an area of a frame image in an image collected by the second collection device, and the image adjustment parameter comprises the target cropped area.

2. The method according to claim 1, wherein determining the target cropped area of the second collection device comprises:
    determining an adjacent transformation relationship between the first front image and the second front image;
    determining a primary-secondary transformation relationship of the second front image relative to a primary collected image of the primary collection device based on the adjacent transformation relationship; and
    determining the target cropped area of the second collection device based on the primary-secondary transformation relationship.

3. The method according to claim 1, wherein determining the image adjustment parameters of the N collection devices comprises:
    transmitting the N images to a computing device, wherein the N images are used by the computing device to determine the image adjustment parameters of the N collection devices based on the skeletal features extracted from the N images.

4. The method according to claim 1, wherein the image adjustment parameters comprise at least one of: an up/down translation parameter, a rotation parameter, or a scaling parameter of the second front image relative to the primary collected image.

5. The method according to claim 1, wherein before the sending the rotation indication, the method further comprises:
    obtaining an instruction of shooting a fine calibration picture through a fine calibration operation interface; and
    before determining the image adjustment parameters of the N collection devices, the method further comprises:
    obtaining an automatic fine calibration instruction through the fine calibration operation interface.

6. The method according to claim 1, wherein sending the rotation indication comprises:
sending a voice rotation prompt, or displaying the voice rotation prompt through a fine calibration operation interface.

7. The method according to claim 1, wherein controlling the poses of the plurality of pan-tilt-zooms comprises:
obtaining N rough calibration images, wherein each of the N rough calibration images is an image collected by each of the N collection devices for the target subject at a same moment; and
determining adjustment angles of N−1 secondary pan-tilt-zooms based on skeletal features extracted from the N rough calibration images, wherein the N−1 secondary pan-tilt-zooms are used to adjust poses of N−1 secondary collection devices in the N collection devices.

8. The method according to claim 7, wherein before obtaining the N rough calibration images, the method further comprises:
obtaining a first image of the target subject, wherein the first image is an image collected by a primary collection device in the N collection devices for the target subject;
sending a position adjustment indication that indicates adjustment of a position of the target subject or adjustment of a pose of a primary pan-tilt-zoom, so that the target subject is located at a target position in the image collected by the primary collection device; and
obtaining a second image of the target subject, wherein in the second image of the target subject is located at the target position.

9. The method according to claim 8, wherein after obtaining the first image of the target subject, the method further comprises:
displaying the first image in a first rough calibration operation interface.

10. The method according to claim 8, wherein after sending the position adjustment indication and before obtaining the second image of the target subject, the method further comprises:
receiving an image adjustment instruction to adjust a pose of the primary collection device; and
controlling an adjustment angle of the primary pan-tilt-zoom, wherein the primary pan-tilt-zoom is configured to change the pose of the primary collection device.

11. The method according to claim 10, wherein receiving the image adjustment instruction comprises:
receiving the image adjustment instruction through a first rough calibration operation interface.

12. The method according to claim 7, wherein:
the skeletal features comprise a skeletal key point; and
determining the adjustment angles of the N−1 secondary pan-tilt-zooms comprises:
extracting a set of skeletal key points from each of the N rough calibration images, to obtain N sets of skeletal key points;
determining a target key point based on each of the N sets of skeletal key points, to obtain N target key points;
determining image space deviations between the N−1 secondary collection devices and the primary collection device based on the N target key points; and
determining the adjustment angles of the N−1 secondary pan-tilt-zooms based on the image space deviation.

13. The method according to claim 7, wherein before obtaining the N rough calibration images, the method further comprises:
obtaining an automatic rough calibration instruction through a second rough calibration operation interface.

14. The method according to claim 1, wherein the target subject is a human body.

15. The method according to claim 1, wherein the target posture corresponds to a T-shape skeletal feature or an A-shape skeletal feature.

16. A method of parameter determining for a computing device, the method comprising:
receiving N images from a control device, wherein each of the N images is a frame of image collected by each of N collection devices for a target subject, the N collection devices are arranged around a target area, lenses of the N collection devices point to the target subject in the target area, and N is a positive integer greater than 1; and
determining image adjustment parameters of the N collection devices based on skeletal features extracted from the N images, wherein the image adjustment parameters are used to obtain a frame image of a free viewpoint video;
wherein
the N images comprise a first front image collected by a first collection device and a second front image collected by a second collection device, the first collection device and the second collection device are located at adjacent arrangement positions in the N collection devices, and (i) an arrangement position of the first collection device is closer to a primary collection device in the N collection devices than an arrangement position of the second collection device, or (ii) the first collection device is the primary collection device; and
determining the image adjustment parameters of the N collection devices comprises:
determining a target cropped area of the second collection device based on a skeletal feature extracted from the first front image and a skeletal feature extracted from the second front image, wherein the target cropped area is an area of the frame image in a collected image of the second collection device.

17. The method according to claim 16, wherein determining the target cropped area of the second collection device comprises:
determining an adjacent transformation relationship between the first front image and the second front image;
determining a primary-secondary transformation relationship of the first front image relative to a primary collected image of the primary collection device based on the adjacent transformation relationship; and
determining the target cropped area of the second collection device based on the primary-secondary transformation relationship.

18. A non-transitory computer-readable storage medium having a computer program stored therein, which when executed by a processor, causes the processor to perform operations, the operations comprising:
controlling poses of a plurality of pan-tilt-zooms, causing lenses of N collection devices on the plurality of pan-tilt-zooms to point to a target subject in a target area, wherein the N collection devices are arranged around the target area, and N is a positive integer greater than 1;

sending a rotation indication that indicates the target subject to maintain rotation in a target posture;

obtaining N images, wherein each of the N images is a frame of image collected by each of the N collection devices for the target subject; and determining image adjustment parameters of the N collection devices based on skeletal features extracted from the N images, wherein the image adjustment parameters are used to obtain a frame image of a free viewpoint video;

wherein the N images comprise a first front image collected by a first collection device and a second front image collected by a second collection device, the first collection device and the second collection device are located at adjacent arrangement positions in the N collection devices, and (i) an arrangement position of the first collection device is closer to a primary collection device than an arrangement position of the second collection device, or (ii) the first collection device is the primary collection device; and determining the image adjustment parameters of the N collection devices comprises:

determining a target cropped area of the second collection device based on a skeletal feature extracted from the first front image and a skeletal feature extracted from the second front image, wherein the target cropped area of the second collection device is an area of a frame image in an image collected by the second collection device, and the image adjustment parameter comprises the target cropped area.

* * * * *